United States Patent
Ohashi et al.

(10) Patent No.: US 6,575,023 B2
(45) Date of Patent: Jun. 10, 2003

(54) TIRE AIR PRESSURE DETERMINING APPARATUS AND METHOD OF DETERMINING TIRE AIR PRESSURE

(75) Inventors: Hideki Ohashi, Chiryu (JP); Masahiro Yonetani, Toyota (JP); Yukio Mori, Nagoya (JP); Takeyasu Taguchi, Nagoya (JP); Yuichi Inoue, Tajimi (JP); Takaji Umeno, Aichi-gun (JP)

(73) Assignees: Toyota Jidosha Kabushiki Kaisha, Toyota (JP); Aisin Seiki Kabushiki Kaisha, Kariya (JP); Denso Corporation, Kariya (JP)

( * ) Notice: Subject to any disclaimer, the term of this patent is extended or adjusted under 35 U.S.C. 154(b) by 0 days.

(21) Appl. No.: 09/838,291

(22) Filed: Apr. 20, 2001

(65) Prior Publication Data

US 2001/0032500 A1 Oct. 25, 2001

(30) Foreign Application Priority Data

Apr. 20, 2000 (JP) ........................... 2000-118877

(51) Int. Cl.[7] .............................................. G01M 17/02
(52) U.S. Cl. ........................... 73/146; 340/442; 340/444
(58) Field of Search ............................... 73/146–146.8; 340/442–447

(56) References Cited

U.S. PATENT DOCUMENTS 6,323,765 B1 * 11/2001 Horie et al. .................. 340/442
6,408,690 B1 * 6/2002 Young et al. ................. 73/146.5

FOREIGN PATENT DOCUMENTS

JP        A09286213    * 11/1997    ........... B60C/23/00

* cited by examiner

Primary Examiner—Hezron Williams
Assistant Examiner—Jermaine Jenkins
(74) Attorney, Agent, or Firm—Oliff & Berridge, PLC (57) ABSTRACT

A variable value (dynamic load radial deviation β) for making determination of a tire air pressure is calculated from pulse number cumulative values PFL, PFR, PRL and PRR that are cumulated for individual wheels when a predetermined condition is fulfilled. The calculated variable value is stored as a reference variable value, and a speed of a vehicle at the time when the reference variable value is calculated is stored as a reference vehicle speed associated with the reference variable value. If the value is newly calculated, it is determined whether or not a vehicle speed at that moment is within a predetermined vehicle speed range determined by the reference vehicle speed. If it is determined that the vehicle speed is within the predetermined vehicle speed range, it is determined, based on a difference between the newly calculated variable value and the reference variable value associated with the reference vehicle speed, whether or not the tire air pressure is normal.

Thus, even if the vehicle is fitted with one or more tires that depend greatly on vehicle speed, the possibility of erroneously determining that a tire air pressure is not normal can be eliminated.

29 Claims, 5 Drawing Sheets

TIRE AIR PRESSURE DETERMINING APPARATUS AND METHOD OF DETERMINING TIRE AIR PRESSURE

INCORPORATION BY REFERENCE

The disclosure of Japanese Patent Application No. 2000-118877 filed on Apr. 20, 2000 including the specification, drawings and abstract is incorporated herein by reference in its entirety.

BACKGROUND OF THE INVENTION

1. Field of the Invention

The invention relates to a tire air pressure determining apparatus that determines whether or not a tire air pressure of a vehicle is normal and, more particularly, to a tire air pressure determining apparatus that does not erroneously determine, when a tire air pressure is actually normal, that the tire air pressure is not normal, even in the case where wheels are fitted with tires that are different in dependency of dynamic load radius on vehicle speed.

2. Description of Related Art

An apparatus of this type, e.g., as disclosed in Japanese Patent Application Laid-Open No. 9-286213, has wheel speed sensors that generate pulses in accordance with rotation of wheels, and is designed to calculate a difference β between a sum (PFR+PRL) of a wheel speed pulse number (cumulative value) PFR of a front-right wheel and a wheel speed pulse number (cumulative value) PRL of a rear-left wheel within a predetermined period and a sum (PFL+PRR) of a wheel speed pulse number (cumulative value) PFL of a front-left wheel and a wheel speed pulse number (cumulative value) PRR of a rear-right wheel within the predetermined period (the dynamic load radial deviation β=(PFR+PRL)−(PFL+PRR)), determine, if the difference β is greater than a predetermined value, that an air pressure of one of the wheels is not normal, and advise a passenger of a result of determination by means of an alarm such as a lamp, etc.

However, the vehicle may be fitted with two types of tires, i.e., tires having a dynamic load radius that greatly changes in accordance with a change in vehicle speed and thus depending greatly on vehicle speed, and tires having a dynamic load radius that slightly changes in accordance with a change in vehicle speed and thus depending slightly on vehicle speed. In the above-mentioned apparatus, in the case where the vehicle is fitted with both types of tires, the absolute value of the dynamic load radial deviation (referred to also as a dynamic load radius relative comparison value) β may become great despite the fact that tire air pressures of all the wheels are normal. This causes a problem of erroneously determining that a tire air pressure is not normal.

SUMMARY OF THE INVENTION

It is an object of the invention to provide a tire air pressure determining apparatus that does not erroneously determine that a tire air pressure is not normal, even in the case where a vehicle is fitted with both types of tires, i.e., a tire that is greatly dependent on vehicle speed and a tire that is slightly dependent on vehicle speed.

The invention has been made to achieve the above object. A tire air pressure determining apparatus of the invention has wheel speed pulse generating means that generates a pulse every time wheels of a vehicle rotate by a predetermined angle and that is provided for each of the wheels, and determines, based on a pulse generated by the wheel speed pulse generating means, whether or not a tire air pressure is normal. This tire air pressure determining apparatus comprises vehicle speed detecting means that detects a speed of the vehicle, variable value calculating means that calculates a variable value for making determination of a tire air pressure based on a pulse generated by the wheel speed pulse generating means when a predetermined condition is fulfilled, reference variable value storing means that stores the calculated variable value as a reference variable value, reference vehicle speed storing means that stores a speed of the vehicle at the time when the reference variable value is calculated as a reference vehicle speed associated with the reference variable value, vehicle speed condition determining means that determines whether or not a vehicle speed at the time when the variable value calculating means newly calculates the variable value is within a predetermined vehicle speed range determined by the reference vehicle speed, and air pressure determining means that determines, based on a difference between the newly calculated variable value and the reference variable value associated with the reference vehicle speed, whether or not the tire air pressure is normal, if it is determined that the vehicle speed at the time when the variable value calculating means newly calculates the variable value is within the predetermined vehicle speed range determined by the reference vehicle speed.

According to the above-mentioned construction, a variable value for making determination of a tire air pressure is calculated based on a pulse generated by the wheel speed pulse generating means provided for each of the wheels upon fulfillment of the predetermined condition, and the calculated variable value is stored as a reference variable value, and a speed of the vehicle at the time when the reference variable value is calculated is stored as a reference vehicle speed associated with the reference variable value. If the variable value is newly calculated, it is determined whether or not a vehicle speed at that moment is within a predetermined vehicle speed range determined by the reference vehicle speed. If it is determined that the vehicle speed is within the predetermined vehicle speed range, it is determined, based on a difference between the newly calculated variable value and the reference variable value associated with the reference vehicle speed, whether or not a tire air pressure is normal.

That is, in the above-mentioned construction, if it is determined that the vehicle speed at the time when the variable value is newly calculated is within the predetermined vehicle speed range determined by the reference vehicle speed, it is determined, based on a difference between the newly calculated variable value and the reference variable value associated with the reference vehicle speed, whether or not the tire air pressure is normal. Therefore, in the case where the variable value for making determination of a tire air pressure is free from the influence of dependency of dynamic load radius on vehicle speed (strictly speaking, the variable value is susceptible to the influence only to a permissible extent), determination of a tire air pressure is made based on the variable value. Thus, even if the vehicle is fitted with tires that are different in dependency of dynamic load radius on vehicle speed, the possibility of erroneously determining that a tire air pressure is not normal is eliminated.

BRIEF DESCRIPTION OF THE DRAWINGS

The above and other objects, features, advantages, and technical and industrial significance of this invention will be better understood by reading the following detailed description of presently preferred embodiments of the invention, when considered in connection with the accompanying drawings, in which.

DETAILED DESCRIPTION OF PREFERRED EMBODIMENTS

In the following description and the accompanying drawings, the invention will be described in more detail in terms of preferred embodiments.

Figure 1:
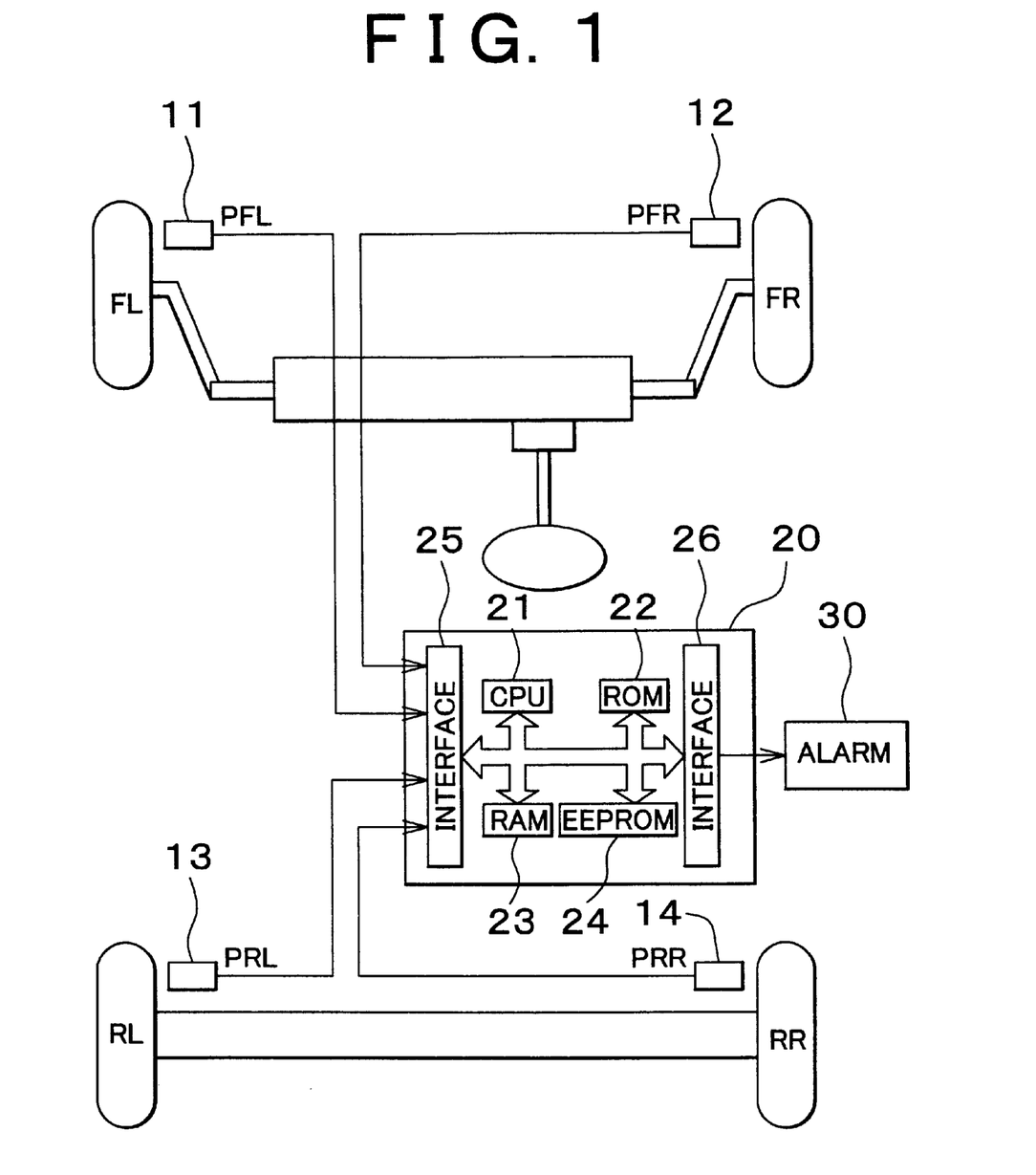
FIG. 1 is an overall view of a tire air pressure determining apparatus according to a first embodiment of the invention.

Hereinafter, a tire air pressure determining apparatus according to a first embodiment of the invention will be described with reference to the drawings. FIG. 1 schematically shows a tire air pressure determining apparatus applied to a four-wheel vehicle. This tire air pressure determining apparatus has wheel speed sensors 11 to 14 that are disposed close to a front-left wheel FL, a front-right wheel FR, a rear-left wheel RL, and a rear-right wheel RR respectively, an electric control circuit 20, and an alarm 30 constructed of a warning lamp that is disposed in an instrument panel.

Each of the wheel speed sensors 11 to 14 is designed to output e.g. 48 pulses (wheel speed pulses) every time a corresponding one of the wheels rotates by 360°. That is, the wheel speed sensors 11 to 14 constitute wheel speed pulse generating means, and each of them outputs one rectangular pulse every time a corresponding one of the wheels rotates by 7.5°. The wheel speed sensors 11 to 14 are connected to the electric control circuit 20 and output wheel speed pulses thereto.

The electric control circuit 20 is constructed as a microcomputer having a CPU 21, a ROM 22, a RAM 23, an EEPROM 24, interfaces 25, 26 and so on, which are interconnected by a bus. The CPU 21 executes a later-described tire air pressure determining program (routine) that is stored in the ROM 22, while utilizing a temporary storage function of the RAM 23. The EEPROM 24 stores data supplied from the CPU 21, and can hold the data even when no electric power is supplied from a power source (not shown). The interface 25 is connected to the wheel speed sensors 11 to 14, receives wheel speed pulses generated by the wheel speed sensors 11 to 14, and sends these pulses to the CPU 21. The interface 26 is connected to the alarm 30, and activates the alarm 30 (i.e., turns the warning lamp on) in response to a command from the CPU 21.

Figure 2:
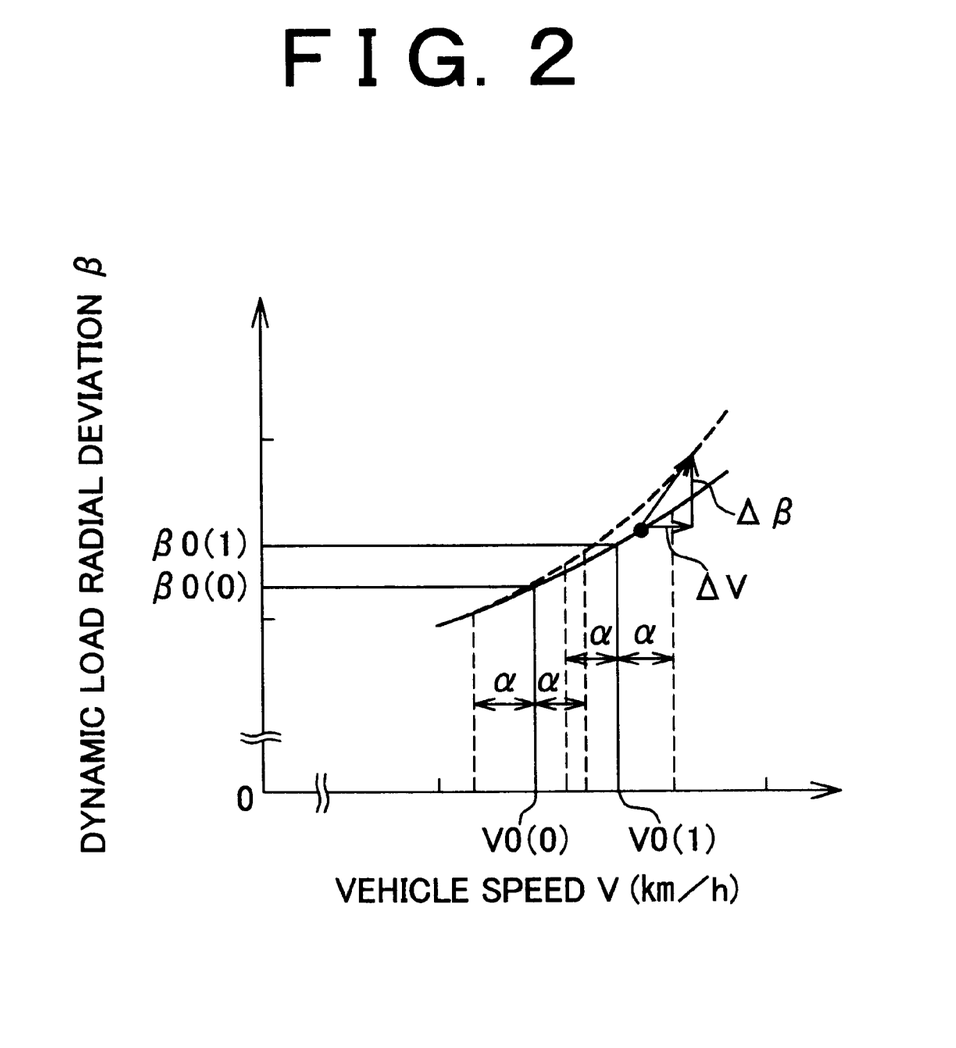
FIG. 2 is an explanatory view of operation of the tire air pressure determining apparatus shown in FIG. 1.
Figure 3A:
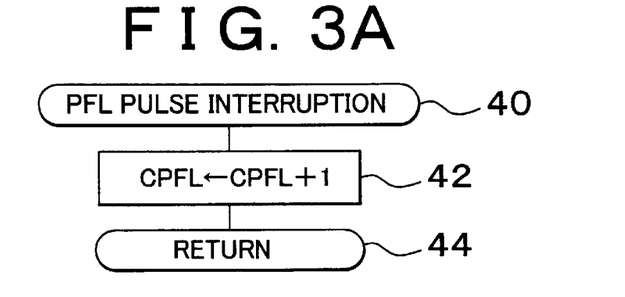
FIG. 3A is a flowchart of a routine that is executed by a CPU shown in FIG. 1 as to a front-left wheel PFL.
Figure 3B:
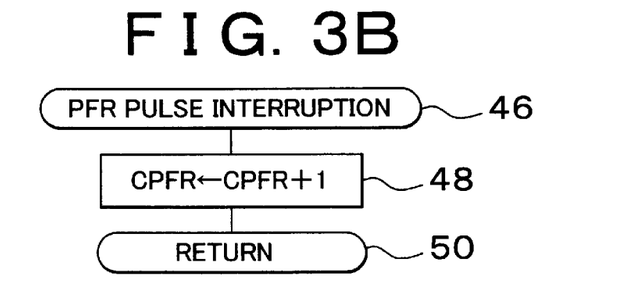
FIG. 3B is a flowchart of a routine that is executed by the CPU shown in FIG. 1 as to a front-right wheel PFR.
Figure 3C:
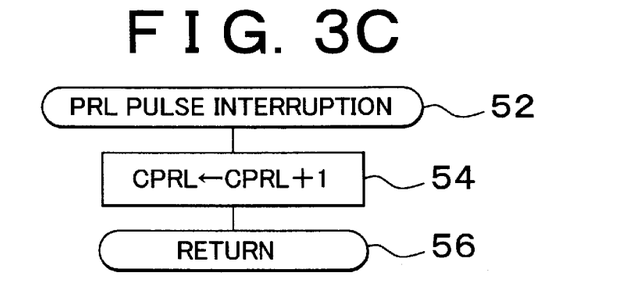
FIG. 3C is a flowchart of a routine that is executed by the CPU shown in FIG. 1 as to a rear-left wheel PRL.
Figure 3D:
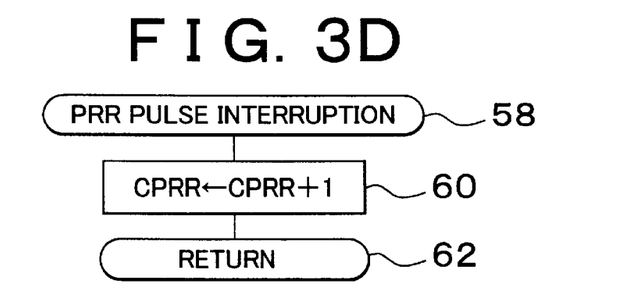
FIG. 3D is a flowchart of a routine that is executed by the CPU shown in FIG. 1 as to a rear-right wheel PRR.

Next, the principle of determination of a tire air pressure in the above-mentioned tire air pressure determining apparatus will be described with reference to FIG. 2. As is the case with the related art, this apparatus utilizes dynamic load radial deviation $\beta$ as a variable for determining a tire air pressure, and thereby determines whether or not the tire air pressure is normal. A dynamic load radial deviation $\beta$ is a difference between a sum (PFL+PRR) of cumulative values PFL, PRR of numbers of wheel speed pulses generated within a predetermined period by the wheel speed sensors 11, 14 that are disposed on one diagonal line in a traveling direction of the vehicle and a sum (PFR+PRL) of cumulative values PFR, PRL of numbers of wheel speed pulses generated within the predetermined period by the wheel speed sensors 12, 13 that are disposed on the other diagonal line. That is, the dynamic load radial deviation $\beta=(PFL+PRR)-(PFR+PRL)$. In this manner, a sum of cumulative values of numbers of wheel speed pulses of the wheel speed sensors that are disposed on one diagonal line, a sum of cumulative values of numbers of wheel speed pulses of the wheel speed sensors that are disposed on the other diagonal line, and a difference between the sums are calculated, with a view to compensating for differences among wheel speeds during turning of the vehicle and improving a degree of precision in determining whether or not a tire air pressure is normal.

This apparatus makes determination of a tire air pressure on the premise that a vehicle can be fitted with both types of tires, i.e., a tire of which the dynamic load radius fluctuates greatly in response to a change in vehicle speed and which depends greatly on vehicle speed (hereinafter referred simply as "dependent on vehicle speed" or "vehicle-speed dependency") and a tire of which the dynamic load radius fluctuates slightly and which depends slightly on vehicle speed.

More specifically, first of all, a dynamic load radial deviation $\beta$ is calculated upon first fulfillment of a predetermined condition for making determination of a tire air pressure (e.g., if a predetermined number or more of vehicle speed pulses are generated at a vehicle speed equal to or higher than 60 km/h) immediately after the vehicle has been shipped from the factory or maintenance of the vehicle has been completed. The dynamic load radial deviation $\beta$ is stored in the EEPROM 24 as a dynamic load radial deviation reference value $\beta0(0)$. A vehicle speed (average of vehicle speed VS0AVE) at the time when the dynamic load radial deviation $\beta$ is calculated is associated with the dynamic load radial deviation reference value $\beta0(0)$ and stored in the EEPROM 24 as a reference vehicle speed V0(0). The reason for this is as follows. For example, immediately after the vehicle has been shipped from the factory or maintenance of the vehicle has been completed, it is considered highly probable that the tire air pressure be normal. Therefore, it stands to reason to obtain the dynamic load radial deviation $\beta$ at this moment as a criterion for making determination of a tire air pressure afterwards.

Then, if the above-mentioned predetermined condition for making determination of a tire air pressure is again fulfilled, a dynamic load radial deviation $\beta$ is calculated again, and an average vehicle speed VS0AVE at this moment is calculated. If the average vehicle speed VS0AVE is within a range of the reference vehicle speed $V0(0)\pm\alpha$, a difference between the newly calculated dynamic load radial deviation $\beta$ and the dynamic load radial deviation reference value $\beta0(0)$ is calculated. Based on this difference, it is determined whether or not a tire air pressure is normal. That is, if the difference is smaller than a predetermined value, it is determined that the tire air pressure is normal, whereas if the difference is greater than the predetermined value, it is determined that the tire air pressure is not normal.

It is because of the following reason that determination of a tire air pressure is made based on the difference between the newly calculated dynamic load radial deviation β and the dynamic load radial deviation reference value β0(0). The dynamic load radial deviation reference value β0(0) is obtained when the tire air pressure is normal or when it is highly probable that the tire air pressure be normal. Therefore, the dynamic load radial deviation reference value β0(0) reflects the influence of fitting the vehicle with tires that are different in vehicle-speed dependency, the influence of different wheel diameters resulting from manufacturing tolerance for tires, etc. Even if these influences are apparent in the newly calculated dynamic load radial deviation β, they can be eliminated (compensated for) by subtracting the dynamic load radial deviation reference value β0(0) from the newly calculated dynamic load radial deviation β. As a result, it is possible to determine with high precision whether or not a tire air pressure is normal.

When average vehicle speed VS0AVE is within the range of the reference vehicle speed V0(0)±α, it is determined, based on the difference between the newly calculated dynamic load radial deviation β and the dynamic load radial deviation reference value β0(0), whether or not a tire air pressure is normal. This is because it can be considered that the difference between the newly calculated dynamic load radial deviation β and the dynamic load radial deviation reference value β0(0) is free from the influence of fitting the vehicle with tires that are different in vehicle-speed dependency (i.e., the influence is negligible) if the average vehicle speed VS0AVE is within the reference vehicle speed V0(0) ±α.

On the other hand, if the average vehicle speed VS0AVE at that moment is not within the range of the reference vehicle speed V0(0)±α, it is probable that the dynamic load radial deviation β be greatly affected by the influence of fitting the vehicle with tires that are different in vehicle-speed dependency. Therefore, a difference Δβ between a newly calculated dynamic load radial deviation β and a last-calculated dynamic load radial deviation βL, a difference ΔV between an average vehicle speed VS0AVE at the time when the dynamic load radial deviation β is newly calculated and an average vehicle speed VS0AVEL at the time when the last dynamic load radial deviation βL is calculated, and a vehicle-speed dependency determining value (Δβ/ΔV), i.e., a ratio of the difference Δβ to the difference ΔV are calculated. If the vehicle-speed dependency determining value (Δβ/ΔV) is equal to or greater than a predetermined value M1, it is determined that the vehicle is fitted with tires that are different in vehicle-speed dependency.

If the average vehicle speed VS0AVE at that moment is not within the range of the reference vehicle speed V0(0)±α and if the vehicle-speed dependency determining value (Δβ/ΔV) is smaller than the predetermined value M1, it is determined that the vehicle is not fitted with tires that are different in vehicle-speed dependency. Then the newly calculated dynamic load radial deviation β and the average vehicle speed VS0AVE at the time when the dynamic load radial deviation β is calculated are stored in the EEPROM 24 as a new dynamic load radial deviation reference value β0(1) and a new reference vehicle speed V0(1), respectively.

As a result, if an average vehicle speed VS0AVE at the time when a dynamic load radial deviation β is newly calculated again is within the reference vehicle speed V0(0) ±α, it is determined, based on the dynamic load radial deviation reference value β0(0), whether or not the above-mentioned tire air pressure is normal. If the average vehicle speed VS0AVE at that moment is not within the range of the reference vehicle speed V0(0)±α, it is determined whether or not the average vehicle speed VS0AVE is within the range of the reference vehicle speed V0(1)±α. If the average vehicle speed VS0AVE at that moment is within the range of the reference vehicle speed V0(0)±α, it is determined, based on the dynamic load radial deviation reference value β0(1), whether or not the above-mentioned tire air pressure is normal. Furthermore, if the average vehicle speed VS0AVE is neither within the range of the reference vehicle speed V0(0)±α nor within the range of the reference vehicle speed V0(1)±α, it is determined, based on the vehicle-speed dependency determining value (Δβ/ΔV), whether or not the vehicle is fitted with tires that are different in vehicle-speed dependency. If it is determined that the vehicle is not fitted with tires that are different in vehicle-speed dependency, the newly calculated dynamic load radial deviation β and the average vehicle speed VS0AVE at the time when the dynamic load radial deviation β is calculated are stored in the EEPROM 24 as a new dynamic load radial deviation reference value β0(2) and a new reference vehicle speed V0(2), respectively.

This apparatus then performs the same processings and sequentially stores dynamic load radial deviation reference values β0(i) and reference vehicle speeds V0(i). The apparatus thereby enlarges a vehicle speed range suited for determination of a tire air pressure and further improves a degree of precision in making determination of a tire air pressure. The foregoing description has illustrated the principle of the apparatus in determining whether or not a tire air pressure is normal and whether or not the vehicle is fitted with tires that are different in vehicle-speed dependency.

Next, actual operation of the tire air pressure determining apparatus based on the above-mentioned principle of determination will be described on a case-by-case basis with reference to FIGS. 3 and 4 that are flowcharts of routines executed by the CPU 21.

(1) In the case where the vehicle is not fitted with tires that are different in vehicle-speed dependency and where a tire air pressure is normal:

First of all, the description will be made as to a state in which the dynamic load radial deviation reference value β0(0) has not been stored in the EEPROM 24 (has not been obtained) e.g., immediately after the vehicle has been shipped from the factory or in the case where contents of the EEPROM 24 have been erased due to maintenance of the vehicle. If an ignition switch (not shown) is changed from "off" to "on" to start the vehicle, the CPU 21 executes interruption routines shown in FIGS. 3(A), 3(B), 3(C) and 3(D) by trailing edges of wheel speed pulses generated by the wheel speed sensors 11 to 14, respectively. That is, the CPU 21 starts executing the PFL pulse interruption routine shown in FIG. 3(A) from step 40 by a trailing edge of a pulse generated by the wheel speed sensor 11, then increases a value of a pulse counter CPFL for counting the number of pulses by "1" in step 42, and proceeds to step 44 to terminate the present interruption routine. As for wheel speed pulses generated by the other wheel speed sensors 12 to 14, the CPU 21 executes the routines shown in FIGS. 3(B), 3(C) and 3(D) respectively, and increases a value of a corresponding one of pulse counters CPFR, CPRL and CPRR by "1" for every trailing edge of a pulse generated by each of the wheel speed sensors 12 to 14.

Figure 4:
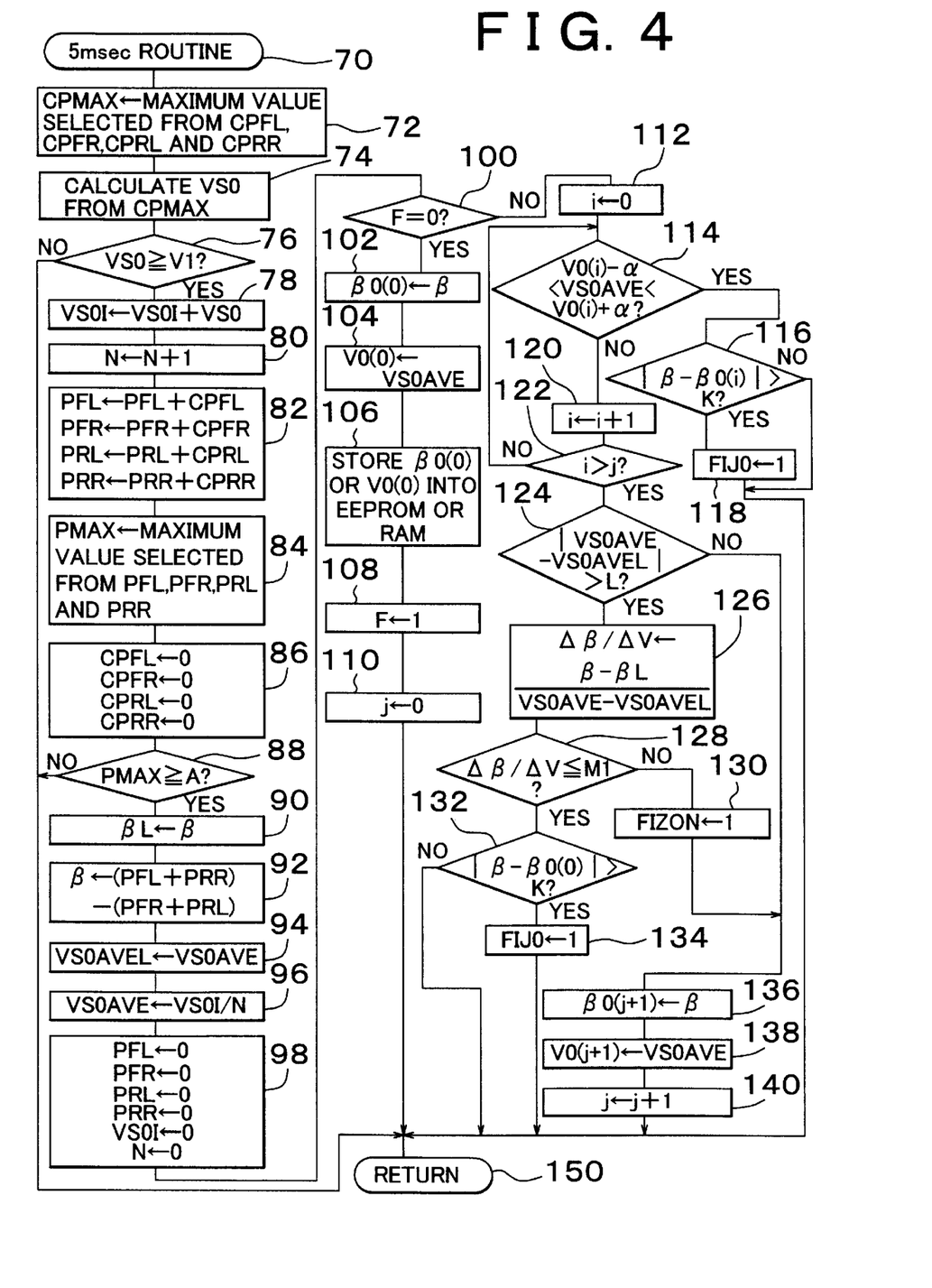
FIG. 4 is a flowchart of a routine that is executed by the CPU shown in FIG. 1.

The CPU 21 starts executing a tire air pressure determining routine shown in FIG. 4 from step 70 every time a predetermined time (e.g., 5 msec) elapses. The CPU 21 then proceeds to step 72, selects a maximum value from the pulse counters CPFL, CPFR, CPRL and CPRR, and sets the maximum value as a maximum value CPMAX. The CPU 21 then proceeds to step 74 and calculates a vehicle speed VS0 from the pulse maximum value CPMAX. More specifically, the pulse maximum value CPMAX is divided by a period (e.g., 5 msec) from last execution of the present routine to current execution of the present routine, whereby the vehicle speed VS0 is obtained.

The CPU 21 then proceeds to step 76 and determines whether or not the vehicle speed VS0 is equal to or higher than a predetermined vehicle speed (e.g., 60 km/h). If the result of determination in step 76 is "No", the CPU 21 proceeds to step 150 on the ground that one of the conditions for making determination of a tire air pressure has not been fulfilled, and terminates the present routine temporarily. On the other hand, if the result of determination in step 76 is "Yes", the CPU 21 proceeds to step 78, stores a value obtained by adding the vehicle speed VS0 calculated in step 74 to a current vehicle speed cumulative value VS0I as a new vehicle speed cumulative value VS0I, and then increases a value of a counter N by "1" in step 80. These steps 78, 80 are processings for obtaining values that are required for calculating an average vehicle speed VS0AVE in later-described step 96.

Next, the CPU 21 proceeds to step 82 and updates pulse number cumulative values PFL, PFR, PRL and PRR by adding values of the pulse counters CPFL, CPFR, CPRL and CPRR to current pulse number cumulative values PFL, PFR, PRL and PRR respectively.

Next, the CPU 21 proceeds to step 84, selects a maximum value from the pulse number cumulative values PFL, PFR, PRL and PRR, sets the maximum value as a cumulative pulse number maximum value PMAX, and clears the pulse counters CPFL, CPFR, CPRL and CPRR in step 86.

Next, the CPU 21 proceeds to step 88 and determines whether or not the cumulative pulse number maximum value PMAX is equal to or greater than a predetermined value A (e.g., 90000). If the result of determination in step 88 is "No", the CPU 21 proceeds to step 150 on the ground that a sufficient number of wheel speed pulses required for making determination of a tire air pressure have not been generated (i.e., that one of the conditions for making determination of a tire air pressure has not been fulfilled), and terminates the present routine temporarily. On the other hand, if the result of determination in step 88 is "Yes", the CPU 21 proceeds to step 90 and thenceforth to make determination of a tire air pressure and determine whether or not the vehicle is fitted with tires that are different in vehicle-speed dependency.

The CPU 21 stores a currently held dynamic-load radial deviation $\beta$ as a last-calculated dynamic load radial deviation $\beta L$ in step 90. However, since there is no dynamic load radial deviation $\beta$ currently held, a predetermined fixed value is stored as the dynamic load radial deviation $\beta L$ or this step is ignored (i.e., it is concluded that there is no value calculated last time). Next, the CPU 21 proceeds to step 92 and newly calculates a dynamic load radial deviation $\beta$. That is, the CPU 21 calculates a current dynamic load radial deviation $\beta$. More specifically, the CPU 21 calculates a difference between a sum (PFL+PRR) of the cumulative values PFL, PRR of wheel speed pulses calculated in step 82 and a sum (PFR+PRL) of the cumulative values PFR, PRL of wheel speed pulses calculated in step 82, as a dynamic load radial deviation $\beta$. That is, the dynamic load radial deviation $\beta=(PFL+PRR)-(PFR+PRL)$.

Next, the CPU 21 proceeds to step 94 and stores an average vehicle speed VS0AVE stored (held) at that moment as a last average vehicle speed VS0AVEL. However, since the average vehicle speed VS0AVE cannot be obtained at this moment, a predetermined fixed value is stored as the last average vehicle speed VS0AVEL or this step is ignored (i.e., it is concluded that there is no value calculated last time). The CPU 21 then proceeds to step 96, divides the vehicle speed cumulative value VS0I calculated in step 78 by the value of the counter N calculated in step 80, stores the quotient as a new average vehicle speed (current average vehicle speed) VS0AVE, and clears the pulse number cumulative values PFL, PFR, PRL and PRR, the vehicle speed cumulative value VS0I, and the value of the counter N in step 98.

Next, the CPU 21 proceeds to step 100 and determines whether or not a flag F indicates a value of "0". If there is no dynamic load radial deviation reference value $\beta 0(0)$ stored in the EEPROM 24, the flag F is set as "0". If the dynamic load radial deviation reference value $\beta 0(0)$ is stored in the EEPROM 24, the flag F is set as "1".

Because there is no dynamic load radial deviation reference value $\beta 0(0)$ stored in the EEPROM 24 at this moment, the flag F indicates a value of "0". Therefore, the CPU 21 makes determination of "Yes" in step 100, proceeds to step 102, and stores the dynamic load radial deviation $\beta$ calculated in step 92 as the dynamic load radial deviation reference value $\beta 0(0)$. Next, the CPU 21 proceeds to step 104, stores the average vehicle speed calculated in step 96 as the reference vehicle speed V0(0), and stores the dynamic load radial deviation reference value $\beta 0(0)$ and the reference vehicle speed V0(0) into the EEPROM 24 or the RAM 23.

Due to the foregoing processings, the dynamic load radial deviation reference value $\beta 0(0)$ that is used as a criterion for making later-described determination of a tire air pressure and determining whether or not the vehicle is fitted with tires that are different in vehicle-speed dependency, and the reference vehicle speed V0(0) that indicates a vehicle speed at which the reference value $\beta 0(0)$ is obtained are set.

The CPU 21 then proceeds to step 108 and sets the flag F as "1". The CPU 21 then sets a variable j as "0" in step 110, proceeds to step 150, and terminates the present routine temporarily. The value indicated by the flag F is also stored in the EEPROM 24 in step 108, so that it will not be lost even after the ignition switch has been turned "off".

Likewise, the CPU 21 thereafter executes the routine shown in FIG. 4 repeatedly every time a predetermined time (e.g., 5 msec) elapses. Accordingly, if a predetermined running state of the vehicle continues, the cumulative pulse number maximum value, which is the maximum value selected from the pulse number cumulative values PFL, PFR, PRL and PRR, becomes equal to or greater than the predetermined value A. The CPU 21 makes determination of "Yes" in step 88, and performs processings in steps 90 to 98. As a result, the last dynamic load radial deviation $\beta$, the current dynamic load radial deviation $\beta$ (at this moment), the last average vehicle speed VS0AVEL, and the current average vehicle speed VS0AVE (at this moment) are updated.

The CPU 21 then proceeds to step 100. At this stage, the flag F has been set as "1" in step 108. Thus, the CPU 21 makes determination of "No" in step 100, proceeds to step 112, and sets a variable i as "0" in step 112. The CPU 21 then proceeds to step 114 and determines whether or not the average vehicle speed VS0AVE is higher than the reference vehicle speed $V0(i)-\alpha$ and lower than the reference vehicle speed $V0(i)+\alpha$. At this stage, since the variable i is "0", it is actually determined whether or not the average vehicle speed VS0AVE is within the range of the reference vehicle speed $V0(0)\pm\alpha$.

If it is determined that the average vehicle speed VS0AVE is within the range of the reference vehicle speed V0(0)±α at this moment, the CPU 21 makes determination of "Yes" in step 114, proceeds to step 116 and thenceforth, and determines whether or not the absolute value of a difference between the current dynamic load radial deviation β and the dynamic load radial deviation reference value β0(i)=β0(0) is greater than a predetermined value K.

In this case, since the vehicle is not fitted with tires that are different in dependency of dynamic load radius on vehicle speed and since a tire air pressure is normal, the absolute value of the difference Δβ0 between the current dynamic load radial deviation β and the dynamic load radial deviation reference value β0(0) is smaller than the predetermined value K. Thus, the CPU 21 makes determination of "No" in step 116, proceeds directly to step 150, and terminates the present routine temporarily.

If the average vehicle speed VS0AVE is not within the range of the reference vehicle speed V0(0)±α in step 114, the CPU 21 makes determination of "No" in step 114, proceeds to step 120, and increase the variable i by "1". As a result, the variable i is "1" at this moment. The CPU 21 then proceeds to step 122 and determines whether or not the variable i is greater than the variable j. At this moment, the variable j has been set as "0" in step 110. Thus, since the variable i (=1) is greater than the variable j (=0), the CPU 21 makes determination of "Yes" in step 122 and proceeds to step 124 and thenceforth. That is, it is considered that the current average vehicle speed VS0AVE is greatly different from the reference vehicle speed V0(0) and that the difference Δβ0 between the current dynamic load radial deviation β and the dynamic load radial deviation reference value β0(0) is greatly affected by the influence of fitting the vehicle with tires that are different in vehicle-speed dependency. Therefore, instead of immediately making determination of a tire air pressure, it is determined first of all whether or not the vehicle is fitted with tires that are different in vehicle-speed dependency.

More specifically, the CPU 21 determines whether or not the absolute value of a difference ΔV between the average vehicle speed VS0AVE at the time when the new dynamic load radial deviation β is calculated in step 124 (current average vehicle speed) and the average vehicle speed VS0AVEL at the time when the dynamic load radial deviation βL is calculated last time (last average vehicle speed) (|the current average vehicle speed VS0AVE-the last average vehicle speed VS0AVEL|) is greater than a predetermined value L. If the absolute value of the difference ΔV0 is greater than the predetermined value L, the CPU 21 proceeds to step 126, calculates a difference Δβ between the currently calculated dynamic load radial deviation β and the last-calculated dynamic load radial deviation β and a difference ΔV between the average vehicle speed VS0AVE at the time when the dynamic load radial deviation β is calculated and the average vehicle speed VS0AVEL at the time when the dynamic load radial deviation βL is calculated, and calculates a vehicle-speed dependency determining value (Δβ/ΔV), which is a quotient (ratio) of the difference Δβ to the difference ΔV.

Next, the CPU 21 determines in step 128 whether or not the vehicle-speed dependency determining value (Δβ/ΔV) is equal to or smaller than a predetermined value M1. In this case, since the vehicle is not fitted with tires that are different in vehicle-speed dependency, the vehicle-speed dependency determining value (Δβ/ΔV) is equal to or smaller than a predetermined value M1. Therefore, the CPU 21 makes determination of "Yes" in step 128, proceeds to step 132, and determines whether or not the absolute value of a difference Δβ0 between the currently newly calculated dynamic load radial deviation β and the dynamic load radial deviation reference value β0(0) is greater than the predetermined value K. In this case, since a tire air pressure is normal, the result of determination in step 132 is "No". The CPU 21 proceeds to step 150 immediately and terminates the present routine temporarily.

If the absolute value of the difference ΔV between the average vehicle speed VS0AVE at the time when the dynamic load radial deviation β is calculated and the average vehicle speed VS0AVEL at the time when-the last dynamic load radial deviation βL is calculated is smaller than the predetermined value L in step 124, determination of vehicle-speed dependency threatens to bring about an erroneous result. Thus, the CPU 21 makes determination of "No" in step 124 and proceeds to step 136. Then, the currently newly calculated dynamic load radial deviation β is stored into the EEPROM 24 as a new dynamic load radial deviation reference value β0(1) (β0(j+1);j=0), and the average vehicle speed VSAVE at the time when the dynamic load radial deviation β is calculated in step 138 is stored into the EEPROM 24 as a new reference vehicle speed V0(1) (V0(j+1); j=0). The CPU 21 then increases the variable j by "1" in step 140, proceeds to step 150, and terminates the present routine temporarily.

Likewise, the CPU 21 thereafter executes the routine shown in FIG. 4 repeatedly every time a predetermined time elapses. Accordingly, if a predetermined running state of the vehicle continues, the CPU 21 reaches step 114. As described above, it is determined in step 114 whether or not the average vehicle speed VS0AVE is within the reference vehicle speed V0(i)±α, and the variable i has been set as "0" in step 112. Accordingly, if it is assumed that the average vehicle speed VS0AVE at that moment is within the range of the reference vehicle speed V0(0)±α, the CPU 21 makes determination of "Yes" in step 114 and proceeds to step 116 and thenceforth.

On the other hand, if it is determined that the average vehicle speed VS0AVE at that moment is not within the range of the reference vehicle speed V0(0)±α, the CPU 21 makes determination of "No" in step 114 and increases the variable i by "1" in step 120. As a result, the variable i assumes a value of "1". The CPU 21 then proceeds to step 122 and determines whether or not the variable i is greater than the variable j.

If the processing in step 140 has been performed by this moment, the variable j has been set as "1". Thus, since the variable i (=1) is equal to the variable j (=1), the CPU 21 makes determination of "No" in step 122, returns to step 114, and determines whether or not the average vehicle speed VS0AVE is within the range of the reference vehicle speed V0(i)±α=V0(1)±α.

If the average vehicle speed VS0AVE is within the range of the reference vehicle speed V0(1)±α, the CPU 21 makes determination of "Yes" in step 114, proceeds to step 116 and thenceforth, and makes determination of a tire air pressure using the absolute value of a difference between the current dynamic load radial deviation β and the dynamic load radial deviation reference value β0(i)=β0(1). If the average vehicle speed VS0AVE is not within the reference vehicle speed V0(1)±α, the CPU 21 makes determination of "No" in step 114 and increases the variable i by "1" in step 120, thus setting the variable i as "2". As a result, the variable i (=2) becomes greater than the variable j (=1). Therefore, the CPU 21 makes determination of "Yes" in step 122 and proceeds to the processings in step 124 and thenceforth.

Furthermore, the CPU 21 determines in step 124 whether or not the absolute value of the difference ΔV0 between the average vehicle speed VS0AVE at the time when the new dynamic load radial deviation β is calculated (current average vehicle speed) and the average vehicle speed VS0AVEL at the time when the last dynamic load radial deviation βL is calculated (last average vehicle speed) is greater than the predetermined value L. If it is smaller than the predetermined value L, the CPU 21 performs the processings in steps 136 to 140, and stores the dynamic load radial deviation reference value β0(j+1)=β0(2) and the reference vehicle speed V0(j+1)=V0(2) into the EEPROM 24. Thus, the dynamic load radial deviation reference value β0(i) and the reference vehicle speed V0(i) are increased, whereby a vehicle speed range for making determination of a tire air pressure is enlarged.

(2) In the case where the vehicle is not fitted with tires that are different in vehicle-speed dependency and where a tire air pressure is not normal:

In this case, when the average vehicle speed VS0AVE comes into the range of the reference vehicle speed V0(i)±α, the absolute value of the difference between the current dynamic load radial deviation β and the dynamic load radial deviation reference value β0(i) becomes greater than the predetermined value K. Therefore, the CPU 21 makes determination of "Yes" in step 116, proceeds to step 118, and sets a flag FIJO indicating that a tire air pressure is not normal as "1".

If the average vehicle speed VS0AVE is not within the range of the reference vehicle speed V0(i)±α and if the absolute value of the difference ΔV0 between the current average vehicle speed VS0AVE and the last average vehicle speed VS0AVEL is greater than the predetermined value L, the CPU 21 proceeds to step 128. However, since the vehicle-speed dependency determining value (Δβ/βV) is smaller than the predetermined value M1, the CPU 21 makes determination of "Yes" in step 128 and proceeds to step 132. Because the tire air pressure is not normal, the absolute value of the difference between the dynamic load radial deviation β and the dynamic load radial deviation reference value β0(0) is greater than the predetermined value K. Therefore, the CPU 21 makes determination of "Yes" in step 132, proceeds to step 134, and sets the flag FIJO as "1". In other respects, operation is identical with that of the above-mentioned case (1).

(3) In the case where the vehicle is fitted with tires that are different in vehicle-speed dependency and where a tire air pressure is normal:

In this case, when the average vehicle speed VS0AVE comes into the range of the reference vehicle speed V0(i)±α, the absolute value of the difference between the current dynamic load radial deviation β and the dynamic load radial deviation reference value β0(i) becomes smaller than the predetermined value K. Therefore, the CPU 21 makes determination of "No" in step 116 and proceeds directly to step 150. Thus, the flag FIJO is not set as "1" in step 118, and an erroneous determination that a tire air pressure is not normal will not be made.

In this case, the vehicle-speed dependency determining value (Δβ/ΔV) calculated in step 126 is greater than the predetermined value M1. Therefore, if the average vehicle speed VS0AVE is not within the range of the reference vehicle speed V0(1)±α and if the absolute value of the difference ΔV0 between the current average vehicle speed VS0AVE and the last average vehicle speed VS0AVEL is greater than the predetermined value L, the CPU 21 proceeds to step 128, makes determination of "No", and proceeds to step 130 without making determination of a tire air pressure. The CPU 21 sets a flag FIZON indicating that the vehicle is fitted with tires that are different in vehicle-speed dependency as "1" in step 130, and then proceeds to steps 136 to 140. As a result, the dynamic load radial deviation reference value β0(i) and the reference vehicle speed V0(i) are sequentially increased, and a vehicle speed range for making determination of a tire air pressure is enlarged.

Furthermore, since the CPU 21 does not make determination of "Yes" in step 128, it performs the processings in steps 132, 134. Thus, the flag FIJO is not set as "1", and an erroneous determination that a tire air pressure is not normal will not be made.

(4) In the case where the vehicle is fitted with tires that are different in dependency of dynamic load radius on vehicle speed and where a tire air pressure is not normal:

In this case, when the average vehicle speed VS0AVE is within the range of the reference vehicle speed V0(i)±α, the absolute value of the difference between the current dynamic load radial deviation β and the dynamic load radial deviation reference value β0(i) becomes greater than the predetermined value K. Thus, the CPU 21 makes determination of "Yes" in step 116, proceeds to step 118, and sets the flag FIJO indicating that a tire air pressure is not normal as "1".

If the average vehicle speed VS0AVE is not within the reference vehicle speed V0(i)±α and if the absolute value of the difference ΔV0 between the current average vehicle speed VS0AVE and the last average vehicle speed VS0AVEL is greater than the predetermined value L, the CPU 21 proceeds to step 128. However, since the vehicle-speed dependency determining value (Δβ/ΔV) becomes greater than the predetermined value M1, the CPU 21 makes determination of "No" in step 128, proceeds to step 130, and sets the flag FIZON as "1". In other respects, operation is identical with that of the above-mentioned case (1). The foregoing description illustrates operation of the first embodiment.

Thus, in the first embodiment, the dynamic load radial deviation reference value β0(i) and the reference vehicle speed V0(i) corresponding thereto (associated therewith) are stored sequentially. If the average vehicle speed VS0AVE at the time when the dynamic load radial deviation β is newly calculated is within the range of the reference vehicle speed V0(i)±α and if it is determined, on the ground that the average vehicle speed VS0AVE is not within the reference vehicle speed V0(i)±α, that the vehicle is not fitted with tires that are different in vehicle-speed dependency, determination of a tire air pressure is made based on the new dynamic load radial deviation β and the dynamic load radial deviation reference value β0(i) and/or β0(0), respectively. As a result, the possibility of erroneously determining, on the ground that the vehicle is fitted with tires that are different in vehicle-speed dependency, that a tire air pressure is not normal when it is actually normal is eliminated.

Next, as for a tire air pressure determining apparatus according to a second embodiment of the invention, first of all, the principle of making determination of a tire air pressure will be described. As is the case with the first embodiment, a dynamic load radial deviation β=(PFL+PRR)−(PFR+PRL) is calculated in the second embodiment, and the dynamic load radial deviation β is utilized to make determination of a tire air pressure. Also, determination of a tire air pressure is made on the premise that the vehicle can be fitted with tires that are different in vehicle-speed dependency.

In this embodiment, for the purpose of making determination of a tire air pressure, a vehicle speed range is divided into a plurality of vehicle speed ranges i (i indicates a natural number). In this example, the vehicle speed range is divided into three-ranges, i.e., a vehicle speed range 1 (vehicle speed V1 to V2), a vehicle speed range 2 (vehicle speed V2 to V3), and a vehicle speed range 3 (vehicle speed V3 to V4, V1<V2<V3<V4). In this case, vehicle speed widths among the vehicle speed ranges (V2–V1, V3–V2, V4–V3) may either equal to one another or different from one another.

In this embodiment, if a dynamic load radial deviation β is calculated for the first time, e.g., immediately after the vehicle has been shipped from the factory or maintenance of the vehicle has been completed, the dynamic load radial deviation β is stored into the EEPROM 24 as the dynamic load radial deviation reference value β0(i). The variable i is determined depending on to which one of the above-mentioned vehicle speed ranges a vehicle speed (average vehicle speed) at the time when the dynamic load radial deviation β is calculated belongs. For example, if the vehicle speed at the time when the dynamic load radial deviation β is calculated is higher than the vehicle speed V1 and lower than the vehicle speed V2, the variable i is "1". The dynamic load radial deviation reference value β0(i) is further stored as a dynamic load radial deviation reference initial value β0.

In the case where a new dynamic load radial deviation β has been obtained, if a vehicle at that moment belongs to the vehicle speed range of the dynamic load radial deviation reference value β0(i) stored in the EEPROM 24, a difference Δβ1 between the new dynamic load radial deviation β and the dynamic load radial deviation reference value β0(i) is calculated, and it is determined, based on the difference Δβ1, whether or not a tire air pressure is normal. That is, if the difference Δβ1 is smaller than a predetermined value, it is determined that the tire air pressure is normal, whereas if the difference Δβ1 is greater than the predetermined value, it is determined that the tire air pressure is not normal.

It is because of the same reason as in the first embodiment that determination of a tire air pressure is thus made based on the difference Δβ1 between the newly calculated dynamic load radial deviation β and the dynamic load radial deviation reference value β0(i). Further, if the vehicle speed at the time when the new dynamic load radial deviation β is obtained belongs to the same vehicle speed range as the vehicle speed at the time when the dynamic load radial deviation reference value β0(i) is obtained, it is determined whether or not a tire air pressure is normal. This is because it can be determined that the difference Δβ1 between the newly calculated dynamic load radial deviation β and the dynamic load radial deviation reference value β0(i) is free from the influence of fitting the vehicle with tires that are different in vehicle-speed dependency (i.e., the influence is negligible), if the vehicle speed remains in the same range.

On the other hand, if the vehicle speed at that moment belongs to a vehicle speed range different from the vehicle speed range i to which the vehicle speed at the time when the dynamic load radial deviation reference value β0(i) is calculated belongs, it is considered that the dynamic load radial deviation β (or the difference Δβ1 between the dynamic load radial deviation β and the dynamic load radial deviation reference value β0(i)) may be greatly affected by the influence of fitting the vehicle with tires that are different in vehicle-speed dependency. Thus, in this case, a difference Δβ2 between the newly calculated dynamic load radial deviation β and a last-calculated dynamic load radial deviation βOLD (vehicle-speed dependency determining value) is calculated. If the difference Δβ2 is equal to or greater than a predetermined value M2, it is determined that the vehicle is fitted with tires that are different in vehicle-speed dependency. Also, in this case, the newly calculated dynamic load radial deviation β is stored into the EEPROM 24 as a dynamic load radial deviation reference value β0(j) (j indicates a natural number other than i). For example, when the variable i is "1", the variable j is "2" or "3".

On the other hand, if the vehicle speed at that moment belongs to a vehicle speed range different from the vehicle speed range i to which the vehicle speed at the time when the dynamic load radial deviation reference value β0(i) is calculated belongs and if the vehicle-speed dependency determining value Δβ2 is smaller than the predetermined value M2, it is determined that the vehicle is not fitted with tires that are different in vehicle-speed dependency. Then, the dynamic load radial deviation reference initial value β0 is stored into the EEPROM 24 as a new dynamic load radial deviation reference value β0(j). This is because it is considered that the dynamic load radial deviation reference initial value β0 is more probably a value that is obtained when a tire air pressure is normal than the newly calculated dynamic load radial deviation β.

As a result, when a new dynamic load radial deviation β is calculated again, it is determined whether or not a vehicle speed at that moment belongs to the vehicle speed range i or the vehicle speed range j. If the vehicle speed belongs to one of the vehicle speed ranges, the above-mentioned determination of a tire air pressure is made based on the difference Δβ1 between the new dynamic load radial deviation β and the dynamic load radial deviation reference value β0(i) or β0(j) of the vehicle speed range to which the new dynamic load radial deviation β belongs. If the vehicle speed at the time when the dynamic load radial deviation β is calculated belongs to neither the vehicle speed range i nor the vehicle speed range j, it is determined, based on the difference Δβ2 between the newly calculated dynamic load radial deviation β and the last-calculated dynamic load radial deviation βOLD, whether or not the vehicle is fitted with tires that are different in vehicle-speed dependency. If it is determined that the vehicle is fitted with tires that are different in vehicle-speed dependency, the newly calculated dynamic load radial deviation β is stored as a dynamic load radial deviation reference value β0(k) (k indicates a natural number other than i, j) for the vehicle speed. If it is determined that the vehicle is not fitted with tires that are different in vehicle-speed dependency, the dynamic load radial deviation reference initial value β0 is stored as the dynamic load radial deviation reference value β0(k) of a range k to which the vehicle speed at the time when the dynamic load radial deviation β is newly calculated belongs.

In this manner, dynamic load radial deviation reference values β0(i) are stored into the pre-divided vehicle speed ranges. Every time a dynamic load radial deviation β is newly obtained, it is determined whether or not the dynamic load radial deviation reference value β0(i) has already been stored into the vehicle speed range to which a vehicle speed at that moment belongs. In accordance with a result of this determination, determination of a tire air pressure is made based on the difference Δβ1, and it is determined, based on the difference Δβ2, whether or not the vehicle is fitted with tires that are different in vehicle-speed dependency.

Figure 5:
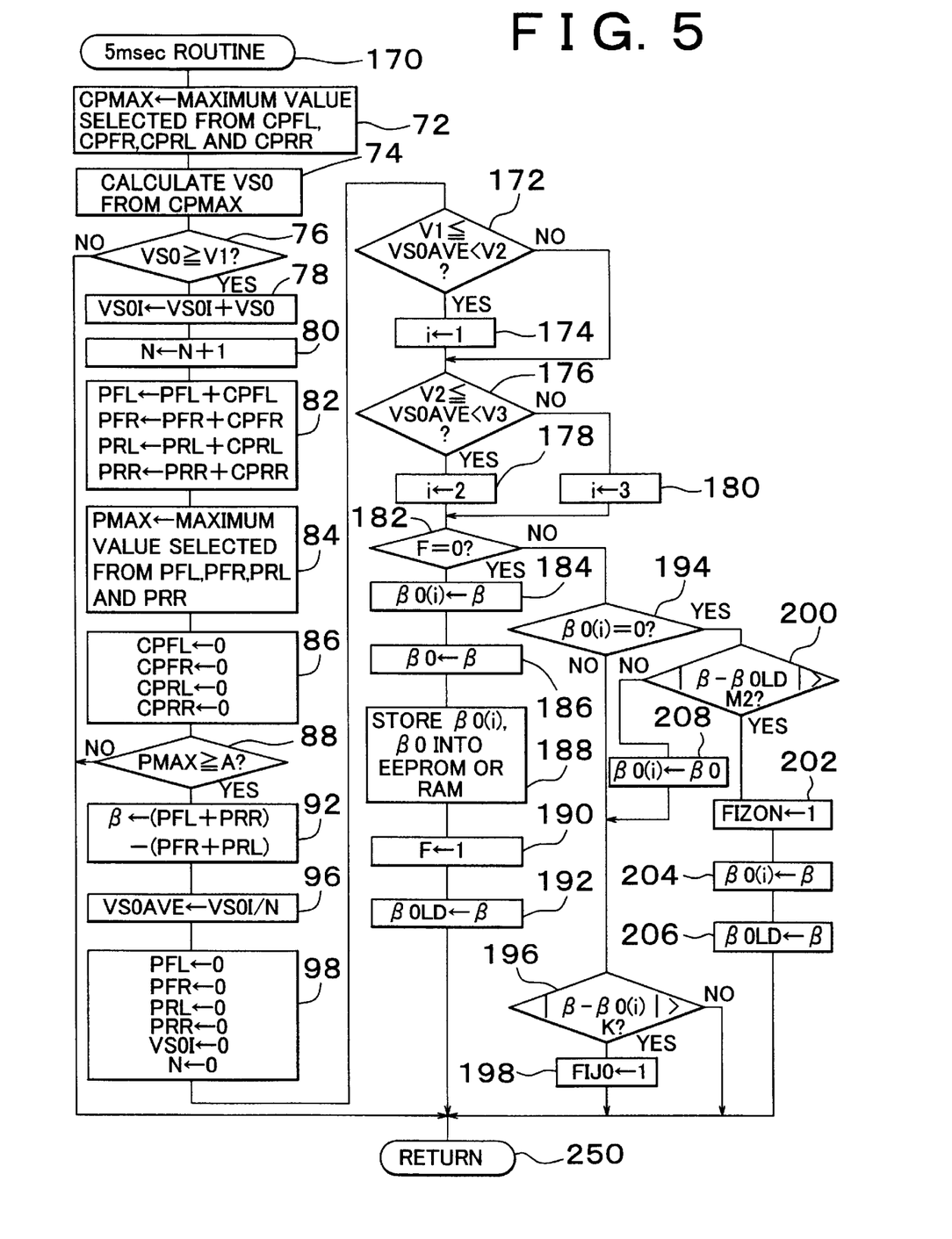
FIG. 5 is a flowchart of a routine that is executed by a CPU of a tire air pressure determining apparatus according to a second embodiment of the invention.

Next, concrete operation of the second embodiment will be described. The second embodiment is different from the first embodiment only in that the CPU 21 executes a routine shown in FIG. 5 instead of the routine shown in FIG. 4. Therefore, the following description will be made with reference to FIG. 5. In FIG. 5, steps which are identical with those shown in FIG. 4 are denoted by the same reference numerals, and detailed description thereof will be omitted.

In the second embodiment, the CPU 21 suitably performs the processings in steps 72 to 88, 92, 96 and 98 in accordance with a running state of the vehicle as in the first embodiment, and then proceeds to step 172 to determine whether or not the average vehicle speed VS0AVE belongs to the vehicle speed range 1. That is, the CPU 21 determines whether or not the average vehicle speed VS0AVE is equal to or higher than the predetermined vehicle speed V1 defining the vehicle speed range 1 (the vehicle speed V1 is set equal to a predetermined value VI in step 76) and lower than the predetermined vehicle speed V2. If the average vehicle speed VS0AVE belongs to the vehicle speed range 1, the CPU 21 sets the variable i as "1" in step 174 and proceeds to step 176. If the average vehicle speed VS0AVE does not belong to the vehicle speed range 1, the CPU 21 proceeds directly to step 176.

In step 176, the CPU 21 determines whether or not the average vehicle speed VS0AVE is equal to or higher than the predetermined vehicle speed V2 defining the vehicle speed range 2 and lower than the predetermined vehicle speed V3. If the result of determination in step 176 is "Yes", the CPU 21 sets the variable i as "2" in step 178 on the ground that the average vehicle speed VS0AVE belongs to the vehicle speed range 2. On the other hand, if the result of determination in step 176 is "No", the CPU 21 sets the variable i as "3" in step 180 on the ground that the average vehicle speed VS0AVE is regarded as belonging to the vehicle speed range 3.

Then, the CPU 21 determines in step 182 whether or not the flag F indicates a value of "0". The flag F is set as "0" if none of the reference values $\beta 0(i)$ (i; a natural number from 1 to 3) of the dynamic load radial deviation $\beta$ have been stored in the EEPROM 24. The flag F is set as "1" when one of the reference values $\beta 0(i)$ is stored into the EEPROM 24.

At this moment, since none of the dynamic load radial deviation reference values $\beta 0(i)$ are stored in the EEPROM 24, the flag F assumes a value of "0". Therefore, the CPU 21 makes determination of "Yes" in step 182, proceeds to step 184, stores the dynamic load radial deviation $\beta$ as the dynamic load radial deviation reference value $\beta 0(i)$, and then stores the dynamic load radial deviation $\beta$ as the dynamic load radial deviation reference initial value $\beta 0$ in step 186. Next, the CPU 21 proceeds to step 190, sets the flag F as "1", stores the dynamic load radial deviation $\beta$ as the last dynamic load radial deviation $\beta$OLD in step 192, proceeds to step 250, and terminates the present routine temporarily. The value indicated by the flag F is also stored in the EEPROM 24 in step 190, so that it will not be lost even after the ignition switch has been turned "off".

Likewise, the CPU 21 thereafter executes the routine shown in FIG. 5 repeatedly every time a predetermined time (e.g., 5 msec) elapses. Accordingly, if a predetermined running state of the vehicle continues, the processings in steps 92, 96 are performed so that a current dynamic load radial deviation $\beta$ (at this moment) and a current average vehicle speed VS0AVE (at this moment) are newly calculated.

Next, the CPU 21 performs the processings in steps 172 to 180, specifies to which one of the vehicle speed ranges i the current average vehicle speed VS0AVE belongs, and determines the value of the variable i. The CPU 21 then makes determination of "No" in step 182 on the ground that the flag F has been set as "1" in step 190, and proceeds to step 194.

The CPU 21 determines in step 194 whether or not the dynamic load radial deviation reference value $\beta 0(i)$ is "0". If it is determined at this moment that the current average vehicle speed VS0AVE belongs to the same vehicle speed range i as the dynamic load radial deviation reference value $\beta 0(i)$ stored in step 184, the dynamic load radial deviation reference value $\beta 0(i)$ is not equal to "0". Therefore, the CPU 21 makes determination of "No" in step 194, proceeds to step 196, and determines whether or not the absolute value of a difference $\Delta\beta 1$ between a current (newly calculated) dynamic load radial deviation $\beta$ and the dynamic load radial deviation reference value $\beta 0(i)$ is greater than the predetermined value K. That is, in this case, since the current average vehicle speed VS0AVE belongs to the same vehicle speed range i as the average vehicle speed at the time when the dynamic load radial deviation reference value $\beta 0(i)$ is calculated, it is considered that the difference $\Delta\beta 1$ between the current dynamic load radial deviation $\beta$ and the dynamic load radial deviation reference value $\beta 0(i)$ is not greatly affected by the influence of fitting the vehicle with tires that are different in vehicle-speed dependency. Thus, determination of a tire air pressure is made using the absolute value of the difference $\Delta\beta 1$ between the dynamic load radial deviation $\beta$ and the dynamic load radial deviation reference value $\beta 0(i)$.

If the result of determination in step 196 is "Yes", the CPU 21 determines that the tire air pressure is not normal, sets the flag FIJO as "1" in step 198, proceeds to step 250, and terminates the present routine temporarily. If the result of determination in step 196 is "No", the CPU 21 proceeds directly to step 250 and terminates the present routine temporarily.

On the other hand, if the current average vehicle speed VS0AVE does not belong to the same vehicle speed range i as the dynamic load radial deviation reference value $\beta 0(i)$ stored in step 184, i.e., the vehicle speed range 1, the dynamic load radial deviation reference value $\beta 0(i)$ assumes a value of "0". Thus, the CPU 21 makes determination of "Yes" in step 194. The CPU 21 then proceeds to step 200 and determines whether or not the absolute value of a difference $\Delta\beta 2$ between a newly calculated dynamic load radial deviation $\beta$ and the last dynamic load radial deviation $\beta$OLD is greater than the predetermined value M2. It is because the difference $\Delta\beta 2$ is unsusceptible to the influence of fluctuations of tire air pressure due to a short elapsed time after acquisition of the last dynamic load radial deviation $\beta$OLD that the difference $\Delta\beta 2$ between the current dynamic load radial deviation $\beta$ and the last dynamic load radial deviation $\beta$OLD is calculated.

That is, in this case, since the current average vehicle speed VS0AVE belongs to the vehicle speed range different from the vehicle speed range i of the dynamic load radial deviation reference value $\beta 0(i)$, it is possible that the current dynamic load radial deviation $\beta$ or the difference $\Delta\beta$ between the dynamic load radial deviation $\beta$ and the dynamic load radial deviation reference value $\beta 0(i)$ be greatly affected by the influence of fitting the vehicle with tires that are different in vehicle-speed dependency. Therefore, prior to determination of a tire air pressure using the absolute value of the difference $\Delta\beta 1$ between the dynamic load radial deviation $\beta$ and the dynamic load radial deviation reference value $\beta 0(i)$, it is determined, based on the difference $\Delta\beta 2$, whether or not the vehicle is fitted with tires that are different in vehicle-speed dependency.

If the result of determination in step 200 is "Yes", the CPU 21 determines that the vehicle is fitted with tires that are different in vehicle-speed dependency, and sets the flag FIZON as "1" in step 202. Next, the CPU 21 stores the dynamic load radial deviation β as a new dynamic load radial deviation reference value β0(i) in step 204, stores the dynamic load radial deviation β as the last dynamic load radial deviation βOLD in step 206, and terminates the present routine temporarily in step 250.

If the result of determination in step 200 is "No", it can be determined that the vehicle is not fitted with tires that are different in vehicle-speed dependency. Therefore, the CPU 21 proceeds to step 208, stores the dynamic load radial deviation reference initial value β0 stored in step 186 (the dynamic load radial deviation β first stored as the dynamic load radial deviation reference value β0(i)) as the dynamic load radial deviation reference value β0(i), proceeds to step 196 and thenceforth, and makes determination of a tire air pressure using the difference Δβ1. In step 208, as the dynamic load radial deviation reference value β0(i), the dynamic load radial deviation reference initial value β0 is stored instead of the newly calculated dynamic load radial deviation β. This is because it is considered that the dynamic load radial deviation reference initial value β0 is more probably a value that is obtained when a tire air pressure is normal than the newly calculated dynamic load radial deviation β, and because a degree of precision in later making determination of a tire air pressure is improved.

Likewise, the CPU 21 thereafter executes the routine shown in FIG. 5 repeatedly every time a predetermined time elapses. As a result, a new dynamic load radial deviation β and an average vehicle speed VS0AVE at that moment are calculated in steps 92, 96 respectively. In steps 172 to 180, the value of the variable i indicating the vehicle speed range to which the average vehicle speed VS0AVE belongs is determined.

If the dynamic load radial deviation reference value β0(i) for the determined variable i has already been stored, the CPU 21 makes determination of "No" in step 194, proceeds to step 196, and makes determination of a tire air pressure based on the difference Δβ1 between the dynamic load radial deviation β and the dynamic load radial deviation reference value β0(i).

On the other hand, if the dynamic load radial deviation reference value β0(i) for the determined variable i has not been stored, the CPU 21 makes determination of "Yes" in step 194, proceeds to step 200, and determines, based on the difference Δβ2 between the current dynamic load radial deviation β and the last dynamic load radial deviation βOLD, whether or not the vehicle is fitted with tires that are different in vehicle-speed dependency. If it is determined that the vehicle is not fitted with tires that are different in vehicle-speed dependency, the CPU 21 newly stores the dynamic load radial deviation reference initial value β0 as the dynamic load radial deviation reference value β0(i) in step 208, and makes determination of a tire air pressure using the difference Δβ1 between the dynamic load radial deviation β and the dynamic load radial deviation reference value β0(i)=β0 in step 196. If it is determined in step 200 that the vehicle is fitted with tires that are different in vehicle-speed dependency, the CPU 21 sets the flag FIZON as "1" in step 202, stores the current dynamic load radial deviation β as β0(i) in step 204, and updates the last dynamic load radial deviation βOLD in step 206.

Thus, in the second embodiment, it is specified to which one of the pre-divided vehicle speed ranges i the average vehicle speed VS0AVE at the time when the dynamic load radial deviation β is newly calculated belongs, and determination of a tire air pressure is made or it is determined whether or not the vehicle is fitted with tires that are different in vehicle-speed dependency, depending on whether or not the dynamic load radial deviation reference value β0(i) has already been stored in the vehicle speed range. As a result, the possibility of erroneously determining, on the ground that the vehicle is fitted with tires that are different in vehicle-speed dependency, that a tire air pressure is not normal when it is actually normal is eliminated.

As has been described hereinbefore, according to the embodiments of the invention, if it can be erroneously determined, on the ground that the vehicle is fitted with tires that are different in vehicle-speed dependency, that a tire air pressure is not normal, it is determined whether or not the vehicle is fitted with tires that are different in vehicle-speed dependency, before determining whether or not a tire air pressure is normal. Thus, the possibility of erroneous determination of the tire air pressure can be eliminated.

The invention is not limited to the above embodiments and can be implemented in various modes within the scope thereof. For example, in the first and second embodiments, determination of a tire air pressure or the presence of tires that are different in vehicle-speed dependency is made based on the dynamic load radial deviation β. However, such determination can also be made based on a dynamic-load-radius related ratio=(PFL+PRR)/(PFR+PRL) or a dynamic-load-radius representing ratio=(VFR/VFL)−(VRR/VRL). In this case, VFL, VFR, VRL and VRR represent wheel speeds of the front-left wheel, the front-right wheel, the rear-left wheel and the rear-right wheel respectively, and can be calculated from time intervals of pulses generated by the wheel speed sensors 11 to 14 respectively. Further, it is not indispensable to store the dynamic load radial deviation reference value β0(0) and so on in the EEPROM 24. In the case where the dynamic load radial deviation reference value β0(0) and so on are not stored in the EEPROM 24, it is possible to adopt a construction wherein a dynamic load radial deviation β that has been calculated for the first time since the switching of the ignition switch from "off" to "on" is stored as the dynamic load radial deviation reference value β0(0).

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A tire air pressure determining apparatus comprising:
   wheel speed pulse generating means that generates a pulse every time wheels of a vehicle rotate by a predetermined angle and that is provided for each of the wheels;
   vehicle speed detecting means that detects a speed of the vehicle as a vehicle speed;
   variable value calculating means that calculates a variable value for making determination of a tire air pressure based on the pulse generated by the wheel speed pulse generating means when a predetermined condition is fulfilled;
   reference variable value storing means that stores the calculated variable value as a reference variable value;
   reference vehicle speed storing means that stores the vehicle speed at the time when the reference variable value is calculated as a reference vehicle speed associated with the reference variable value;

vehicle speed condition determining means that determines whether or not the vehicle speed at the time when the variable value calculating means newly calculates the variable value is within a predetermined vehicle speed range determined by the reference vehicle speed; and air pressure determining means that determines, based on a difference between the newly calculated variable value and the reference variable value associated with the reference vehicle speed, whether or not the tire air pressure is normal, if it is determined that the vehicle speed at the time when the variable value calculating means newly calculates the variable value is within the predetermined vehicle speed range determined by the reference vehicle speed.

2. The tire air pressure determining apparatus according to claim 1, further comprising:

tire determining means that determines, based on the newly calculated variable value, whether or not the wheels are fitted with tires that are different in dependency of dynamic load radius on vehicle speed, if it is determined that the vehicle speed at the time when the variable value calculating means newly calculates the variable value is not within the predetermined vehicle speed range determined by the reference vehicle speed.

3. The tire air pressure determining apparatus according to claim 2, wherein the tire determining means calculates a difference between the newly calculated variable value and a last-calculated variable value as a variable value difference, calculates a difference between the vehicle speed at the time when the variable value is newly calculated and a vehicle speed at the time when the last variable value is calculated as a vehicle speed difference, and determines, based on a ratio between the variable value difference and the vehicle speed difference, whether or not the wheels are fitted with tires that are different in dependency of dynamic load radius on vehicle speed.

4. The tire air pressure determining apparatus according to claim 3, wherein the tire determining means determines whether or not the wheels are fitted with tires that are different in dependency of dynamic load radius on vehicle speed, if the vehicle speed difference is greater than a predetermined value.

5. The tire air pressure determining apparatus according to claim 3, wherein the reference variable value storing means newly stores the newly calculated variable value as a reference variable value different from the reference variable value, if the vehicle speed difference is equal to or smaller than a predetermined value, and the reference vehicle speed storing means newly stores the vehicle speed at the time when the variable value is newly calculated as a reference vehicle speed associated with the variable value.

6. The tire air pressure determining apparatus according to claim 3, wherein the air pressure determining means determines whether or not the tire air pressure is normal, if the tire determining means determines that the wheels are not fitted with tires that are different in dependency of dynamic load radius on vehicle speed.

7. The tire air pressure determining apparatus according to claim 3, wherein the reference variable value storing means newly stores the newly calculated variable value as a reference variable value different from the reference variable value, if the tire determining means determines that the wheels are fitted with tires that are different in dependency of dynamic load radius on vehicle speed, and the reference vehicle speed storing means newly stores the vehicle speed at the time when the variable value is newly calculated as a reference vehicle speed associated with the variable value.

8. The tire air pressure determining apparatus according to claim 4, wherein the reference variable value storing means newly stores the newly calculated variable value as a reference variable value different from the reference variable value if the vehicle speed difference is equal to or smaller than the predetermined value, and the reference vehicle speed storing means newly stores a vehicle speed at the time when the variable value is newly calculated as a reference vehicle speed associated with the variable value.

9. The tire air pressure determining apparatus according to claim 4, wherein the air pressure determining means determines whether or not the tire air pressure is normal, if the tire determining means determines that the wheels are not fitted with tires that are different in dependency of dynamic load radius on vehicle speed.

10. The tire air pressure determining apparatus according to claim 4, wherein the reference variable value storing means newly stores the newly calculated variable value as a reference variable value different from the reference variable value, if the tire determining means determines that the wheels are fitted with tires that are different in dependency of dynamic load radius on vehicle speed, and the reference vehicle speed storing means newly stores the vehicle speed at the time when the variable value is newly calculated as a reference vehicle speed associated with the variable value.

11. The tire air pressure determining apparatus according to claim 8, wherein the air pressure determining means determines whether or not the tire air pressure is normal, if the tire determining means determines that the wheels are not fitted with tires that are different in dependency of dynamic load radius on vehicle speed.

12. The tire air pressure determining apparatus according to claim 8, wherein the reference variable value storing means newly stores the newly calculated variable value as a reference variable value different from the reference variable value, if the tire determining means determines that the wheels are fitted with tires that are different in dependency of dynamic load radius on vehicle speed, and the reference vehicle speed storing means newly stores the vehicle speed at the time when the variable value is newly calculated as a reference vehicle speed associated with the variable value.

13. The tire air pressure determining apparatus according to claim 11, wherein the reference variable value storing means newly stores the newly calculated variable value as a reference variable value different from the reference variable value, if the tire determining means determines that the wheels are fitted with tires that are different in dependency of dynamic load radius on vehicle speed, and the reference vehicle speed storing means newly stores the vehicle speed at the time when the variable value is newly calculated as a reference vehicle speed associated with the variable value.

14. The tire air pressure determining apparatus according to claim 1, wherein the variable value is a difference between a sum of a pulse number cumulative value PFL of a front-left wheel and a pulse number cumulative value PRR of a rear-right wheel and a sum of a pulse number cumulative value PFR of a front-right wheel and a pulse number cumulative value PRL of a rear-left wheel, i.e., (PFL+PRR)−(PFR+PRL) or (PFR+PRL)−(PFL+PRR).

15. The tire air pressure determining apparatus according to claim 1, wherein the variable value is a ratio between a sum of a pulse number cumulative value PFL of a front-left wheel and a pulse number cumulative value PRR of a rear-right wheel and a sum of a pulse number cumulative value PFR of a front-right wheel and a pulse number cumulative value PRL of a rear-left wheel, i.e., (PFL+PRR)/(PFR+PRL) or (PFR+PRL)/(PFL+PRR).

16. The tire air pressure determining apparatus according to claim 1, wherein the variable value is a difference between a ratio between a rotational speed VFL of a front-left wheel and a rotational speed VFR of a front-right wheel and a ratio between a rotational speed VRL of a rear-left wheel and a rotational speed VRR of a rear-right wheel, i.e., (VFR/VFL)−(VRR/VRL) or (VRR/VRL)−(VFR/VFL).

17. A tire air pressure determining apparatus comprising:

wheel speed pulse generating means that generates a pulse every time wheels of a vehicle rotate by a predetermined angle and that is provided for each of the wheels;

vehicle speed detecting means that detects a speed of the vehicle as a vehicle speed;

variable value calculating means that calculates a variable value for making determination of a tire air pressure based on the pulse generated by the wheel speed pulse generating means when a predetermined condition is fulfilled;

vehicle speed range specifying means that specifies to which one of a plurality of divided ranges the vehicle speed at the time when the variable value is calculated belongs;

reference variable value storing means that stores the calculated variable value as a reference variable value of the range to which the vehicle speed at the time when the variable value is calculated belongs; and air pressure determining means that determines, based on a difference between the newly calculated variable value and the stored reference variable value, whether or not the tire air pressure is normal, if the range to which the vehicle speed at the time when the variable value calculating means newly calculates the variable value belongs is the same as the range to which the vehicle speed of the stored reference variable value belongs.

18. The tire air pressure determining apparatus according to claim 17, further comprising:

tire determining means that determines, based on the newly calculated variable value, whether or not the wheels are fitted with tires that are different in dependency of dynamic load radius on vehicle speed, if the range to which the vehicle speed at the time when the variable value calculating means newly calculates the variable value belongs is different from the range to which the vehicle speed of the stored reference variable value belongs.

19. The tire air pressure determining apparatus according to claim 18, wherein the tire determining means calculates a difference between the newly calculated variable value and a last-calculated variable value as a variable value difference, and determines, based on the variable value difference, whether or not the wheels are fitted with tires that are different in dependency of dynamic load radius on vehicle speed.

20. The tire air pressure determining apparatus according to claim 18, wherein the reference variable value storing means stores a variable value first stored as the reference variable value as a reference variable value of the range to which the vehicle speed at the time when the variable value calculating means newly calculates the variable value belongs, if the tire determining means determines that the wheels are not fitted with tires that are different in dependency of dynamic load radius on vehicle speed.

21. The tire air pressure determining apparatus according to claim 18, wherein the reference variable value storing means stores the newly calculated variable value as a reference variable value of the range to which the vehicle speed at the time when the variable value is calculated belongs, if the tire determining means determines that the wheels are fitted with tires that are different in dependency of dynamic load radius on vehicle speed.

22. The tire air pressure determining apparatus according to claim 19, wherein the reference variable value storing means stores a variable value first stored as the-reference variable value as a reference variable value of the range to which the vehicle speed at the time when the variable value calculating means newly calculates the variable value belongs, if the tire determining means determines that the wheels are not fitted with tires that are different in dependency of dynamic load radius on vehicle speed.

23. The tire air pressure determining apparatus according to claim 19, wherein the reference variable value storing means stores the newly calculated variable value as a reference variable value of the range to which the vehicle speed at the time when the variable value is calculated belongs, if the tire determining means determines that the wheels are fitted with tires that are different in dependency of dynamic load radius on vehicle speed.

24. The tire air pressure determining apparatus according to claim 22, wherein the reference variable value storing means stores the newly calculated variable value as a reference variable value of the range to which the vehicle speed at the time when the variable value is calculated belongs, if the tire determining means determines that the wheels are fitted with tires that are different in dependency of dynamic load radius on vehicle speed.

25. The tire air pressure determining apparatus according to claim 17, wherein the variable value is a difference between a sum of a pulse number cumulative value PFL of a front-left wheel and a pulse number cumulative value PRR of a rear-right wheel and a sum of a pulse number-cumulative value PFR of a front-right wheel and a pulse number cumulative value PRL of a rear-left wheel, i.e., (PFL+PRR)−(PFR+PRL) or (PFR+PRL)−(PFL+PRR).

26. The tire air pressure determining apparatus according to claim 17, wherein the variable value is a ratio between a sum of a pulse number cumulative value PFL of a front-left wheel and a pulse number cumulative value PRR of a rear-right wheel and a sum of a pulse number cumulative value PFR of a front-right wheel and a pulse number cumulative value PRL of a rear-left wheel, i.e., (PFL+PRR)/(PFR+PRL) or (PFR+PRL)/(PFL+PRR).

27. The tire air pressure determining apparatus according to claim 17, wherein the variable value is a difference between a ratio between a rotational speed VFL of a front-left wheel and a rotational speed VFR of a front-right wheel and a ratio between a rotational speed VRL of a rear-left wheel and a rotational speed VRR of a rear-right wheel, i.e., (VFR/VFL)−(VRR/VRL) or (VRR/VRL)−(VFR/VFL).

28. A tire air pressure determining apparatus comprising:

a wheel speed pulse generating device that generates a pulse every time wheels of a vehicle rotate by a predetermined angle and that is provided for each of the wheels;

a vehicle speed detecting device that detects a speed of the vehicle as a vehicle speed;

a variable value calculating device that calculates a variable value for making determination of a tire air pressure based on the pulse generated by the wheel speed pulse generating device when a predetermined condition is fulfilled;

a reference variable value storing device that stores the calculated variable value as a reference variable value;

a reference vehicle speed storing device that stores the vehicle speed at the time when the reference variable value is calculated as a reference vehicle speed associated with the reference variable value;

a vehicle speed condition determining device that determines whether or not the vehicle speed at the time when the variable value calculating device newly calculates the variable value is within a predetermined vehicle speed range determined by the reference vehicle speed; and an air pressure determining device that determines, based on a difference between the newly calculated variable value and the reference variable value associated with the reference vehicle speed, whether or not the tire air pressure is normal, if it is determined that the vehicle speed at the time when the variable value calculating device newly calculates the variable value is within the predetermined vehicle speed range determined by the reference vehicle speed.

29. A tire air pressure determining apparatus comprising:

a wheel speed pulse generating device that generates a pulse every time wheels of a vehicle rotate by a predetermined angle and that is provided for each of the wheels;

a vehicle speed detecting device that detects a speed of the vehicle as a vehicle speed;

a variable value calculating device that calculates a variable value for making determination of a tire air pressure based on the pulse generated by the wheel speed pulse generating device when a predetermined condition is fulfilled;

a vehicle speed range specifying device that specifies to which one of a plurality of divided ranges the vehicle speed at the time when the variable value is calculated belongs;

a reference variable value storing device that stores the calculated variable value as a reference variable value of the range to which the vehicle speed at the time when the variable value is calculated belongs; and an air pressure determining device that determines, based on a difference between the newly calculated variable value and the reference variable value associated with the reference vehicle speed, whether or not the tire air pressure is normal, if it is determined that the vehicle speed at the time when the variable value calculating device newly calculates the variable value is within a predetermined vehicle speed range determined by the reference variable value.

* * * * *